United States Patent
He

(10) Patent No.: US 7,835,246 B2
(45) Date of Patent: Nov. 16, 2010

(54) DECODING APPARATUS AND METHOD

(75) Inventor: Wei-Hung He, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1003 days.

(21) Appl. No.: 11/562,425

(22) Filed: Nov. 22, 2006

(65) Prior Publication Data

US 2007/0121464 A1    May 31, 2007

(30) Foreign Application Priority Data

Nov. 30, 2005  (TW) ............................... 94142114 A

(51) Int. Cl.
    *G11B 20/10* (2006.01)
(52) U.S. Cl. .............. 369/59.23; 369/59.18; 369/59.21; 348/465; 348/470; 375/262; 375/316; 375/340; 375/341
(58) Field of Classification Search .................. 375/262, 375/316, 340, 341; 348/465, 470; 369/59.18, 369/59.21, 59.23
    See application file for complete search history.

(56) References Cited

U.S. PATENT DOCUMENTS

| 6,519,106 | B1 | 2/2003 | Goh et al. |
| 6,552,988 | B1 | 4/2003 | Nishiwaki |
| 6,754,160 | B2 | 6/2004 | Kashihara et al. |
| 7,065,027 | B2 * | 6/2006 | Cheng et al. ............. 369/59.18 |
| 7,098,960 | B2 * | 8/2006 | Suzuki et al. ............... 348/465 |

FOREIGN PATENT DOCUMENTS

| CN | 1497584 A | 5/2004 |
| CN | 1612254 A | 5/2005 |
| TW | 571304 | 1/2004 |

* cited by examiner

*Primary Examiner*—David C Payne
*Assistant Examiner*—Leon Flores
(74) *Attorney, Agent, or Firm*—Winston Hsu; Scott Margo

(57) ABSTRACT

A decoding apparatuses and a method utilized in an optical storage device are disclosed. The decoding apparatus includes: a level slicer for setting a plurality of adjustable boundary values to distinguish a plurality of signal regions, and outputting a set of state values in accordance with signal regions corresponding to an input value; and a Viterbi detector coupled to the level slicer for decoding a transmission data according to the state value.

14 Claims, 5 Drawing Sheets

DECODING APPARATUS AND METHOD

BACKGROUND OF THE INVENTION

1. Field of the Invention

The present disclosure relates to decoding apparatuses and related methods, and more particularly, to decoding apparatuses and methods that correct the non-linear effect by adjusting the boundaries of signal regions of a level slicer.

2. Description of the Prior Art

In an optical storage system, such as a conventional optical disc drive (e.g., VCD player or DVD+/−R disc drive), data are decoded from the conventional RF signal retrieved from an optical disc. However, the RF signal may have mismatch problems due to interference caused by the system or the operating environment, such as the pick-up head drift or electronic noise, and which results in nonlinear distortion to the decoded signal so the decoded digital data stream is prone to errors. The conventional decoding operation decodes data by using a Viterbi detector. For example, the U.S. Pat. No. 6,754,160 utilizes a DC offset compensation control scheme to calculate a proper DC level compensation value to control the input value of the Viterbi detector so that the Viterbi detector decodes the data stored on the optical disc based on a best slicing level and not affected by the nonlinear distortion described previously.

SUMMARY OF THE INVENTION

It is therefore an objective of the present disclosure to provide decoding apparatuses and associated decoding methods for use in an optical storage device. The decoding apparatuses and associated decoding methods provide a set of adjusted state values to a Viterbi detector by adjusting the signal boundaries of a level slicer. Then, the Viterbi detector decodes a transmission data according to the state values.

An exemplary embodiment of a decoding apparatus in an optical storage device is disclosed comprising: a level slicer for setting at least one adjustable boundary value to distinguish a plurality of signal regions, and outputting a set of state values in accordance with a signal region corresponding to an input value; and a Viterbi detector coupled to the level slicer for decoding a transmission data according to the set of state values.

An exemplary embodiment of an optical storage device is disclosed comprising: a pick-up head for emitting a laser beam and receiving reflected laser beam from an optical disc to generate an analog data signal; an analog-to-digital converter (ADC) coupled to the pick-up head for converting the analog data signal to a digital data signal; an equalizer coupled to the ADC for equalizing the digital data signal according to partial response characteristics to generate at least one input value; a level slicer for setting a plurality of adjustable boundary values to distinguish a plurality of signal regions, and outputting a set of state values in accordance with a signal region corresponding to the input value; and a Viterbi detector coupled to the level slicer for decoding a transmission data according to the set of state values.

An exemplary embodiment of a decoding method for use in an optical storage device is disclosed comprising: setting a plurality of adjustable boundary values to distinguish at least one signal region, and outputting a set of state values in accordance with a signal region corresponding to an input value; and decoding a transmission data according to the set of state values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
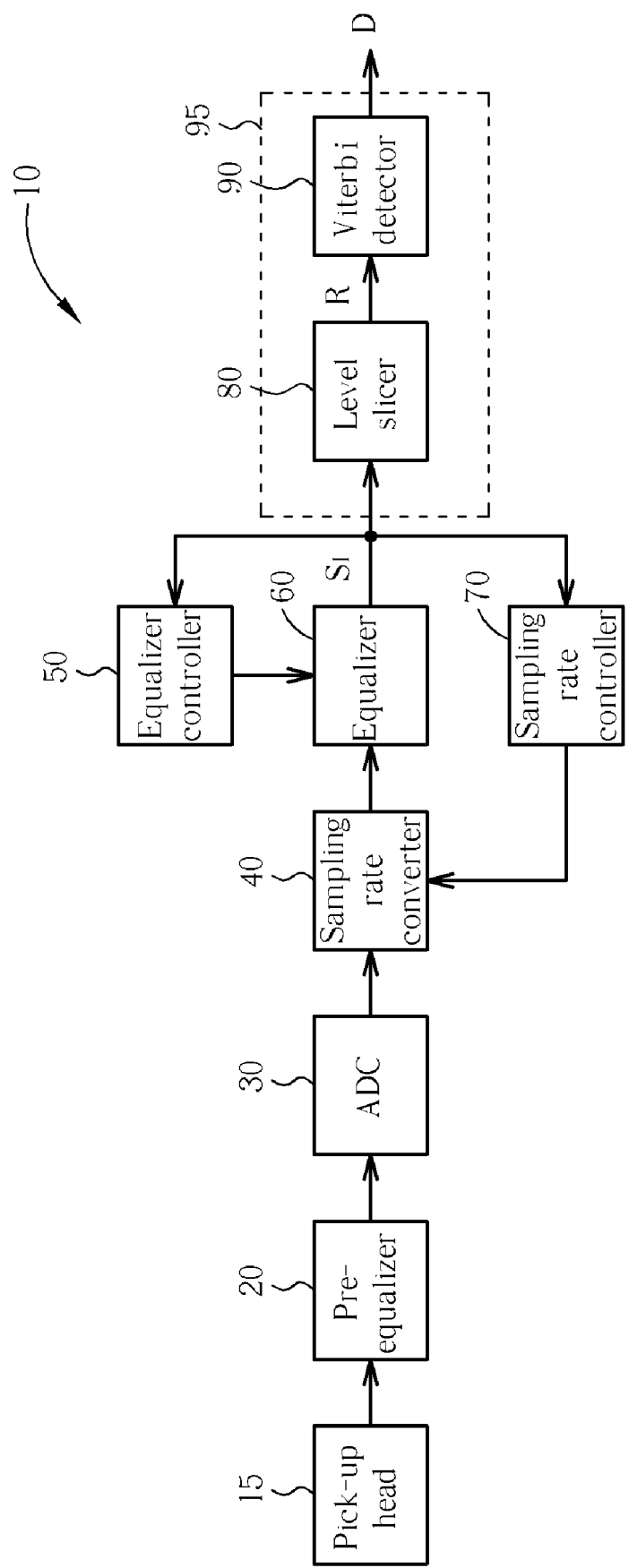
FIG. 1 is a block diagram of a decoding apparatus for use in an optical storage device according to a first embodiment of the present invention

Please refer to FIG. 1, which shows a block diagram of a decoding apparatus 95 for use in an optical storage device 10 according to a first embodiment of the present invention. The optical storage device 10 comprises a pick-up head 15, a pre-equalizer 20, an ADC 30, a sampling rate converter 40, an equalizer 60, an equalizer controller 50, a sampling rate controller 70, and the decoding apparatus 95. As illustrated in FIG. 1, the decoding apparatus 95 comprises a level slicer 80 and a Viterbi detector 90. The pick-up head 15 emits a laser beam to read data recorded on an optical disc and converts the reflected laser beam into an analog signal, i.e., the RF signal described previously. The analog signal is amplified by the pre-equalizer 20 and then converted into a digital signal by the ADC 30. Since the sampling rate adopted by the ADC 30 to perform the analog-to-digital conversion differs from the channel bit rate, the digital signal generated by the ADC 30 needs to be adjusted by sampling rate converter 40 so that the sampling rate and the channel bit rate can be synchronous. Then, the equalizer 60 processes the synchronized signal to generate an input value $S_1$ that satisfies partial response condition. The input value $S_1$ is applied to the equalizer controller 50, the sampling rate controller 70, and the level slicer 80. The equalizer controller 50 and the sampling rate controller 70 respectively adjust the equalizer controller 50 and the sampling rate controller 70 by using feedback control means. The level slicer 80 sets a plurality of adjustable boundary values according to the results of a number of test input values after they are passed through a same channel to distinguish a plurality of signal regions. The level slicer 80 then outputs a state value R according to the signal region corresponding to the input value $S_I$. Finally, the Viterbi detector 90 is able to decode a transmission data D recorded on the optical disc in accordance with the state value R.

Note that the sampling rate converter 40 is employed by the foregoing embodiment to synchronize the sampling rate and the channel bit rate. This is merely an example rather than a restriction of the practical implementations. For example, the sampling rate and the channel bit rate can be synchronized by utilizing a VCO to control the ADC 30.

Figure 2:
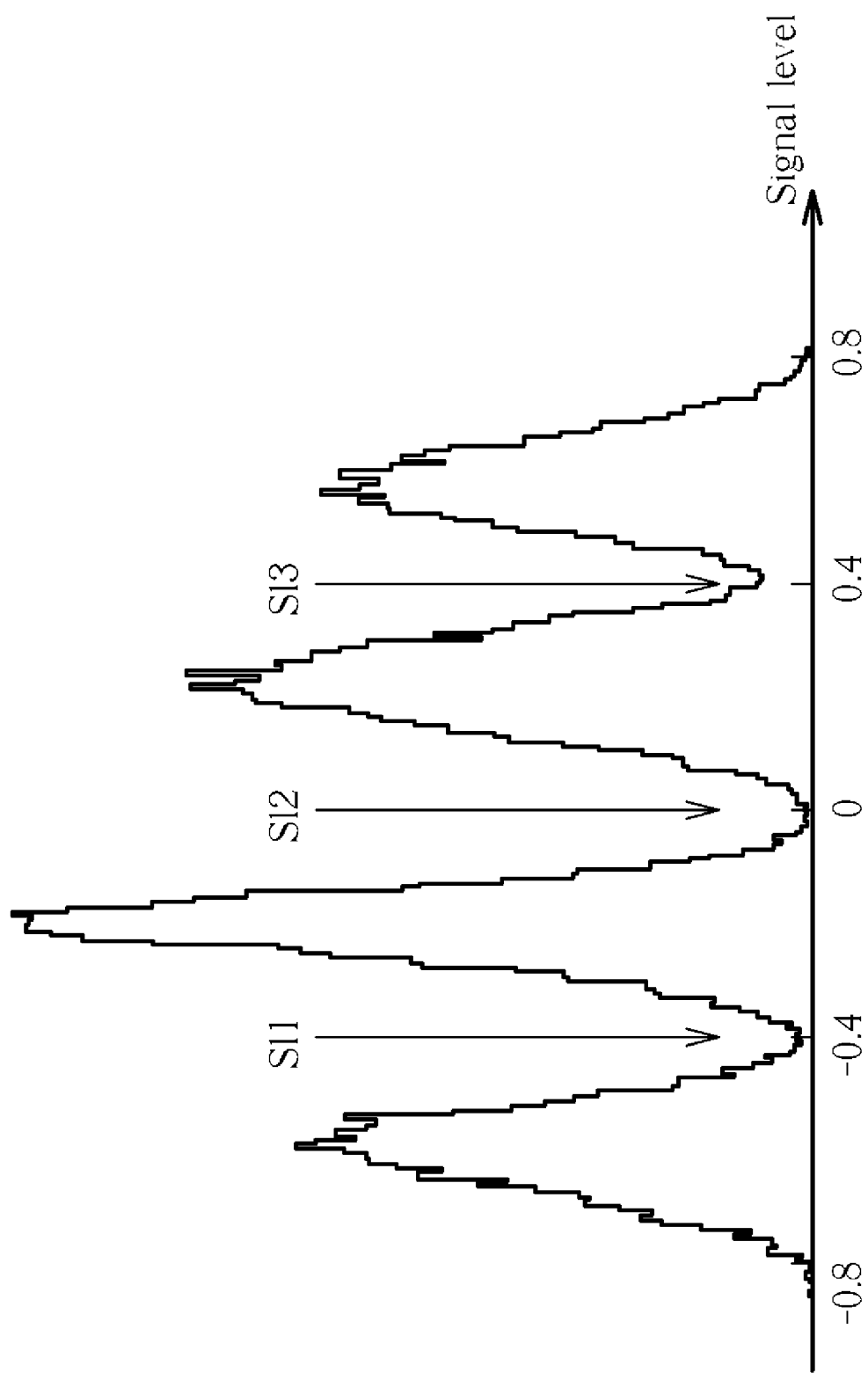
FIG. 2 is a distribution diagram of output levels in the case where the partial response of the equalizer of FIG. 1 is PR[1 2 1] model and the channel has no non-linear distortion.

Hereinafter, the operations of the decoding apparatus 95 will be described in more detail. Please refer to FIG. 2, which shows a distribution diagram of output levels in the case where the partial response of the equalizer 60 is PR[1 2 1]

model and the channel has no non-linear distortion. The equalizer 60 shown in FIG. 1 can be adjusted by using conventional art, such as the least-mean-square (LMS) algorithm. The partial response should be the PR[1 2 1] model so that the level of the input value $S_1$ generated by the equalizer 60 can be divided into four signal regions as shown in FIG. 2. In FIG. 2, the input value $S_1$ is divided into four signal regions by three boundary values SI1~SI3. For no non-linear distortion caused by the mismatch channel effect, the four signal regions are symmetrical with respect to the origin and the boundary values SI1~SI3 are located at −0.4, 0, and 0.4, respectively. In practice, however, the non-linear distortion is unavoidable.

Figure 3:
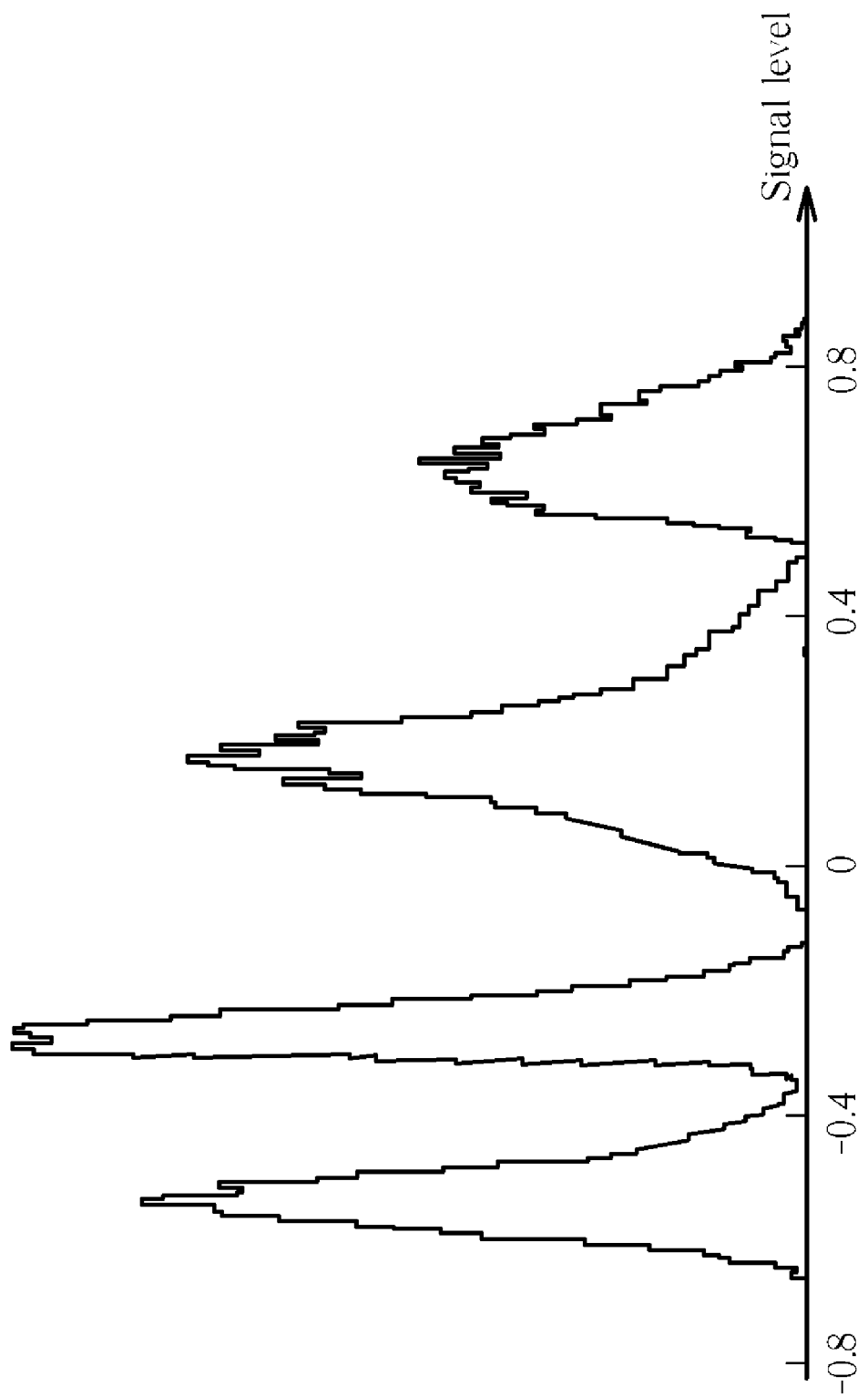
FIG. 3 is a distribution diagram of output levels in the case where the partial response of the equalizer of FIG. 1 is PR[1 2 1] model and the channel has non-linear distortion.

Please refer to FIG. 3, which shows a distribution diagram of output levels in the case where the partial response of the equalizer 60 is PR[1 2 1] model and the channel has non-linear distortion. Due to the effect of the non-linear distortion, each of the four signal regions shifts toward right-hand side or left-hand side, and the interval between signal regions varies. Obviously, if SI1~SI3 are employed as the boundary values, the input value $S_1$ may be erroneously determined to locate within an incorrect signal region. The level slicer 80 outputs the state value R according to the signal region of each input value, and the Viterbi detector 90 decodes the transmission data D recorded on the optical disc based on the sate value R. Accordingly, if the input value $S_1$ is erroneously determined to locate within an incorrect signal region, the transmission data D may be decoded erroneously. Please note that the number of boundary values and signal regions can be adjusted based on the design requirement and not limited to that illustrated in the foregoing embodiment.

Figure 4:
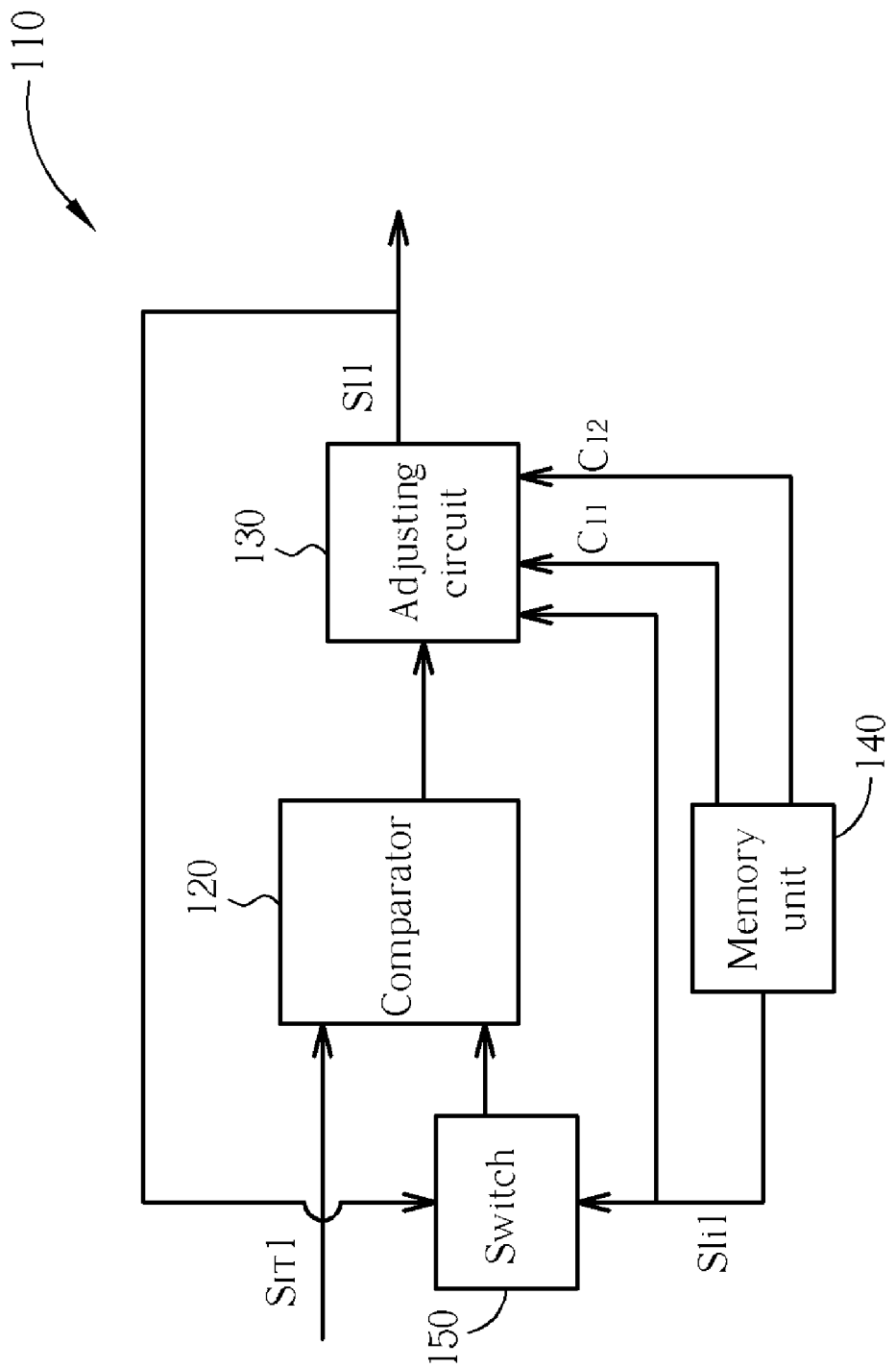
FIG. 4 is a block diagram of a boundary value calibration module of the level slicer of FIG. 1 according to an exemplary embodiment.

In this case, the level slicer 80 comprises a plurality of boundary value calibration modules for calibrating the plurality of boundary values, respectively. Hereinafter, the calibration of the boundary value SI1 is taken as an example to illustrate the operations of the boundary value calibration module. Please refer to FIG. 4, which depicts a block diagram of a boundary value calibration module 110 of the level slicer 80 according to an exemplary embodiment. The boundary value calibration module 110 comprises a comparator 120, an adjusting circuit 130, a memory unit 140, and a switch 150. The memory unit 140 stores an initial boundary value SIi1 and predetermined adjusting values $C_{11}$ and $C_{12}$. When the boundary value calibration module 110 starts to calibrate the boundary value SI1, the switch 150 couples the comparator 120 to the memory unit 140 and disconnects the comparator 120 and the adjusting circuit 130. Thus, the comparator 120 reads the initial boundary value SIi1 from the memory unit 140, and compares a given test input value $S_{TT}1$ with the initial boundary value SIi1 to obtain a comparison result. The comparison result is then applied into the adjusting circuit 130. The adjusting circuit 130 reads the predetermined adjusting values $C_{11}$ and $C_{12}$ stored in the memory unit 140, and selects one of the predetermined adjusting values $C_{11}$ and $C_{12}$ to adjust the initial boundary value SIi1 so as to obtain the boundary value SI1.

For example, if the test input value $S_{TT}1$ is greater than or equal to the initial boundary value SIi1, the adjusting circuit 130 adds the predetermined adjusting value $C_{11}$ to the initial boundary value SIi1 to obtain the boundary value SI1. If the test input value $S_{TT}1$ is less than the initial boundary value SIi1, the adjusting circuit 130 subtracts the predetermined adjusting value $C_{12}$ from the initial boundary value SIi1 to obtain the boundary value SI1. At that time, the switch 150 switches the comparator 120 to the adjusting circuit 130 from the memory unit 140. The adjusted boundary value SI1 is feedback to the comparator 120 to replace the initial boundary value SIi1. Then, the boundary value SI1 is adjusted in the same way until the difference between the test input value $S_{TT}1$ and the boundary value SI1 is less than a threshold. The foregoing descriptions illustrate the calibration of the boundary value SI1. In this embodiment, the other boundary values, such as SI2 and SI3, are adjusted in the same way as the boundary value SI1. In other words, if the level slicer 80 has n boundary values, the level slicer 80 comprises n boundary value calibration modules.

Note that the initial boundary value SIi1 and the predetermined adjusting values $C_{11}$ and $C_{12}$ are adjustable. In order to make SI1 lie between the maximum signal region and the second maximum signal region, the ratio of the predetermined adjusting value $C_{11}$ to the predetermined adjusting value $C_{12}$ can be determined based on statistics information. The adjustment of each boundary value is performed based on the statistic distribution of the boundary value independently. Therefore, when channel mismatch occurs, those boundary values would be individually adjusted to a proper value instead of compensating all the boundary values with a same DC level as the prior art. Additionally, since the predetermined adjusting values are set according to the coding of the input value, the initial boundary value SIi1 and the predetermined adjusting values $C_{11}$ and $C_{12}$ can be pre-recorded in the memory unit 140.

Figure 5:
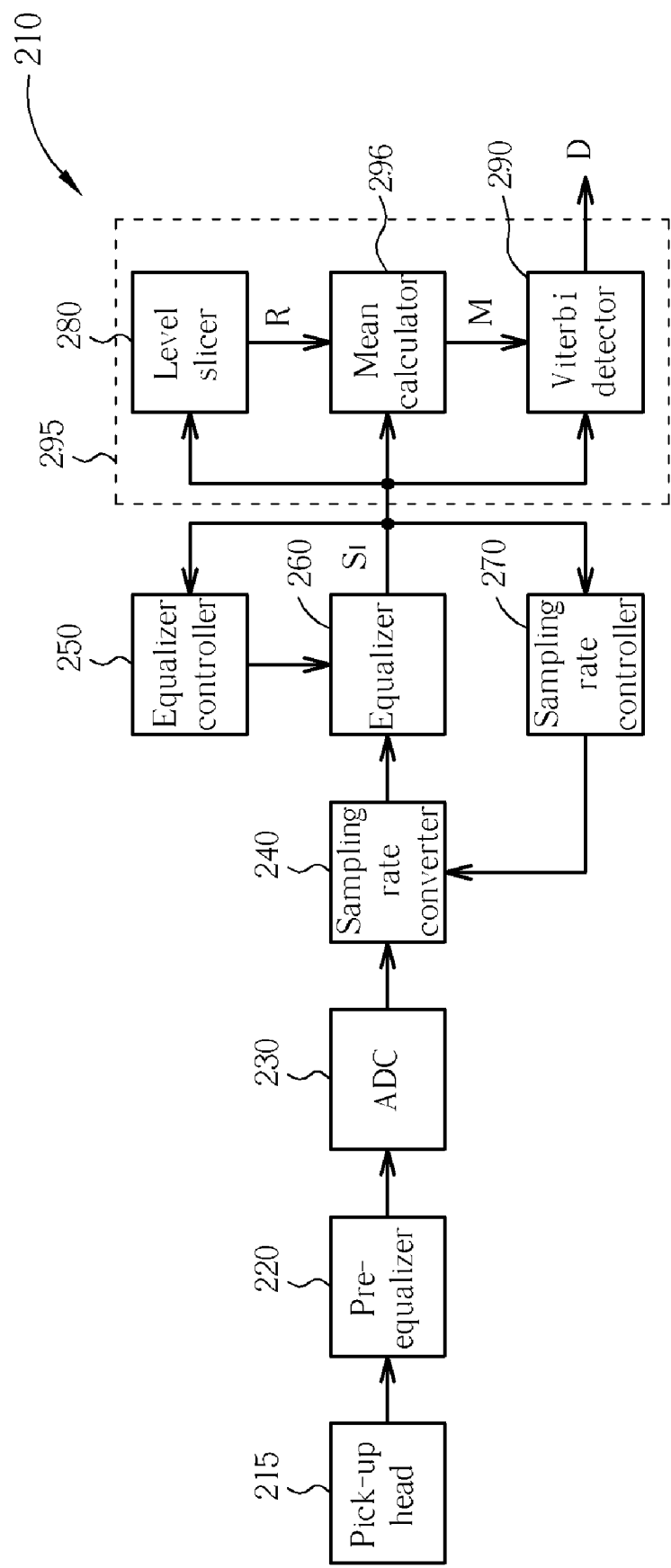
FIG. 5 is a block diagram of a decoding apparatus for use in an optical storage device according to a second embodiment of the present invention.

Please refer to FIG. 5, which shows a block diagram of a decoding apparatus 295 for use in an optical storage device 210 according to a second embodiment of the present invention. The optical storage device 210 comprises a pick-up head 215, a pre-equalizer 220, an ADC 230, a sampling rate converter 240, an equalizer 260, an equalizer controller 250, a sampling rate controller 270, and the decoding apparatus 295. Obviously, a difference between the optical storage device 210 of FIG. 5 and the optical storage device 10 of FIG. 1 is that the components of the decoding apparatus 295 are different to that of the decoding apparatus 95. Specifically, the decoding apparatus 95 of the first embodiment adopts a conventional hard decision Viterbi algorithm to decode data. To improve the decoding performance, the decoding apparatus 295 of the second embodiment adopts a soft decision Viterbi algorithm to decode data. For implementing the soft decision Viterbi algorithm, the transmission data D needs to be decoded based on the input value $S_I$ and a group mean M of the input value $S_I$ with respect to each signal region. Accordingly, the decoding apparatus 295 comprises a level slicer 280, a mean calculator 296, and a Viterbi detector 290. As illustrated in FIG. 5, the input value $S_1$ is simultaneously applied to the level slicer 280, the mean calculator 296, and the Viterbi detector 290. The level slicer 280 sets boundary values for each signal region according to the input value $S_1$, and outputs a state value R to the mean calculator 296. The mean calculator 296 then calculates the group mean M corresponding to the input value $S_1$ according to the state value R. Finally, the Viterbi detector 290 is able to decode a transmission data D in accordance with the input value $S_1$ and the group mean M.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoding apparatus, comprising:
   a level slicer for setting at least one adjustable boundary value to distinguish a plurality of signal regions, and outputting a set of state values in accordance with a signal region corresponding to an input value, wherein the level slicer comprises at least a boundary value calibration module for calibrating the at least one boundary value, each boundary value calibration module comprises:
  a comparator for comparing a test input value with a boundary value;
  an adjusting circuit for selecting an adjusting value to adjust the boundary value according to a comparison result of the test input value and the boundary value; and
  a memory unit for storing an initial boundary value and a plurality of predetermined adjusting values, wherein the plurality of predetermined adjusting values are set according to the coding of the input value; and
a Viterbi detector for decoding a transmission data according to the set of state values.

2. The decoding apparatus of claim 1, wherein the comparator compares the initial boundary value from the memory unit with the input value, and the adjusting circuit selects the adjusting value from the plurality of predetermined adjusting values according to the comparison result of the comparator to adjust the boundary value.

3. The decoding apparatus of claim 1, further comprising:
  a mean calculator, coupled to and disposed between the level slicer and the Viterbi detector, for generating a mean according to the set of state values and the input value;
  wherein the Viterbi detector decodes the transmission data according to the mean and the input value.

4. The decoding apparatus of claim 3, wherein the mean is a group mean of the input value with respect to each signal region.

5. An optical storage device comprising:
  a pick-up head for emitting a laser beam and receiving the laser beam reflected from an optical disc to generate an analog data signal;
  an analog-to-digital converter (ADC) for converting the analog data signal into a digital data signal;
  an equalizer for equalizing the digital data signal according to partial response characteristics to generate at least one input value;
  a level slicer for setting a plurality of adjustable boundary values to distinguish a plurality of signal regions, and outputting a set of state values in accordance with a signal region corresponding to the input value, wherein the level slicer comprises at least a boundary value calibration module for calibrating the at least one boundary value, each boundary value calibration module comprises:
    a comparator for comparing a test input value with a boundary value;
    an adjusting circuit for selecting an adjusting value to adjust the boundary value according to a comparison result of the test input value and the boundary value; and
    a memory unit for storing an initial boundary value and a plurality of predetermined adjusting values, wherein the plurality of predetermined adjusting values are set according to the coding of the input value; and
  a Viterbi detector for decoding a transmission data according to the set of state values.

6. The optical storage device of claim 5, wherein when the boundary value calibration module starts to calibrate the boundary value, the comparator reads the initial boundary value from the memory unit as the boundary value to be compared with the input value.

7. The optical storage device of claim 6, wherein when the boundary value calibration module starts to calibrate the boundary value, the adjusting circuit selects the adjusting value from the plurality of predetermined adjusting values according to the comparison result of the comparator to adjust the boundary value.

8. The optical storage device of claim 5, further comprising:
  a mean calculator, coupled to and disposed between the level slicer and the Viterbi detector, for generating a mean of the input value with respect to each signal region according to the set of state values and the input value;
  wherein the Viterbi detector decodes the transmission data according to the mean and the input value.

9. A decoding method, comprising:
  setting a plurality of adjustable boundary values to distinguish at least one signal region, and outputting a set of state values in accordance with a signal region corresponding to an input value; and
  decoding a transmission data according to the set of state values;
  wherein the step of setting each of adjustable boundary values comprising:
    storing an initial boundary value and a plurality of predetermined adjusting values, wherein the plurality of predetermined adjusting values are set according to the coding of the input value;
    comparing a test input value with a boundary value; and
    selecting an adjusting value to adjust the boundary value according to the comparison result of the test input value and the boundary value.

10. The decoding method of claim 9, wherein the step of selecting an adjusting value to adjust the boundary value comprises:
  reads the initial boundary value and compares it with the input value; and
  selecting the adjusting value to adjust the boundary value according to the comparison result of the initial boundary value and the input value.

11. The decoding method of claim 9, further comprising:
  generating a mean according to the set of state values and the input value;
  wherein the step of decoding the transmission data comprises:
    decoding the transmission data according to the mean and the input value.

12. The decoding method of claim 11, wherein the mean is a group mean of the input value with respect to each signal region.

13. A decoding apparatus, comprising:
  a level slicer for setting at least one boundary value to distinguish a plurality of signal regions, and outputting a set of state values in accordance with a signal region corresponding to an input value; and
  a Viterbi detector for decoding a transmission data according to the set of state values;
  wherein the level slicer comprises at least a boundary value calibration module for calibrating the at least one boundary value, each boundary value calibration module comprises:
    a comparator for comparing a test input value with the boundary value; and
    an adjusting circuit for selecting an adjusting value to adjust the boundary value according to the comparison result;

wherein the boundary value is replaced by the adjusted boundary value, and the comparator repeats comparing the test input value with the boundary value until a difference between the test input value and the boundary value is less than a threshold.

14. A decoding method, comprising:

setting at least one boundary value to distinguish a plurality of signal regions, and outputting a set of state values in accordance with a signal region corresponding to an input value; and decoding a transmission data according to the set of state values;

wherein the step of setting the at least one boundary value comprises:

comparing a test input value with the boundary value;

selecting an adjusting value to adjust the boundary value according to the comparison result;

replacing the boundary value with the adjusted boundary value; and repeats comparing the test input value with the boundary value until a difference between the test input value and the boundary value is less than a threshold.

\* \* \* \* \*